(12) United States Patent
Umejima et al.

(10) Patent No.: US 11,392,170 B2
(45) Date of Patent: Jul. 19, 2022

(54) ELECTRONIC APPARATUS COMPRISING FIRST AND SECOND FLEXIBLE BOARDS THAT EXTEND FROM A FIRST CHASSIS TO A SECOND CHASSIS

(71) Applicant: Lenovo (Singapore) Pte. Ltd., Singapore (SG)

(72) Inventors: Kazuya Umejima, Tokyo (JP); Kazuo Fujii, Kanagawa (JP); Seita Horikoshi, Kanagawa (JP); Kenji Watamura, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/158,692

(22) Filed: Jan. 26, 2021

(65) Prior Publication Data
US 2022/0043293 A1    Feb. 10, 2022

(30) Foreign Application Priority Data

Aug. 7, 2020   (JP) .............................. JP2020-134482

(51) Int. Cl.
*G06F 1/16*   (2006.01)
*G02F 1/1333*   (2006.01)

(52) U.S. Cl.
CPC ........ *G06F 1/1618* (2013.01); *G02F 1/13332* (2021.01); *G02F 1/133314* (2021.01); *G02F 1/133325* (2021.01)

(58) Field of Classification Search
CPC ......... G02F 1/133342; G02F 1/133325; G06F 1/1618
See application file for complete search history.

(56) References Cited

U.S. PATENT DOCUMENTS

| | | | | |
|---|---|---|---|---|
| 2005/0068717 A1 * | 3/2005 | Nakanishi | ........... | H04M 1/0214 |
| | | | | 361/679.21 |
| 2005/0264471 A1 * | 12/2005 | Yamazaki | ............. | G06F 3/1446 |
| | | | | 345/1.1 |
| 2016/0070310 A1 * | 3/2016 | Holung | ................... | E05D 3/122 |
| | | | | 361/679.09 |
| 2017/0148866 A1 * | 5/2017 | Yamazaki | ............. | H01L 27/323 |

FOREIGN PATENT DOCUMENTS

| CN | 104703795 A | * | 6/2015 | ....... | G02F 1/133308 |
|---|---|---|---|---|---|
| EP | 2916165 B1 | * | 4/2018 | ....... | G02F 1/133512 |
| JP | 2020-034845 A | | 3/2020 | | |
| KR | 20020012881 A | * | 2/2002 | | |

* cited by examiner

*Primary Examiner* — Paul C Lee (74) *Attorney, Agent, or Firm* — Osha Bergman Watanabe & Burton LLP (57) ABSTRACT

An electronic apparatus includes: a chassis; a first display in the chassis with a first display surface facing a front surface of the chassis; and a second display in the chassis with a second display surface facing a rear surface of the chassis. The chassis includes: a first glass plate that covers the first display surface and constitutes the front surface of the chassis; a second glass plate that covers the second display surface and constitutes the rear surface of the chassis; and a frame that supports the first glass plate and the second glass plate and constitutes lateral surfaces of the chassis.

5 Claims, 7 Drawing Sheets

ELECTRONIC APPARATUS COMPRISING FIRST AND SECOND FLEXIBLE BOARDS THAT EXTEND FROM A FIRST CHASSIS TO A SECOND CHASSIS

TECHNICAL FIELD

The present invention relates to electronic apparatuses including a display.

BACKGROUND

An electronic apparatus such as a laptop PC includes a first chassis equipped with a display and a second chassis equipped with a motherboard, and a hinge connecting the first and second chassis. The applicant has proposed a configuration of such an electronic apparatus, in which both the front surface and the rear surface of the first chassis are glass plates (see Japanese Unexamined Patent Application Publication No. 2020-034845).

There is a strong demand for thinner chassis of the electronic apparatuses as described above. In particular, the thickness of the first chassis equipped with a display affects not only the thinning of the entire electronic apparatus, but also largely affects the appearance quality during use.

The first chassis therefore is desirably made as thin as possible. Desirably the above-mentioned electronic apparatuses have a thinner chassis, and flexibly respond to various usage patterns by having an increased number of displays.

SUMMARY

One or more embodiments of the present invention provide an electronic apparatus including thin chassis as well as a plurality of displays.

An electronic apparatus according to the first aspect of the present invention includes: a first chassis; a second chassis connecting to the first chassis via a hinge to be relatively rotatable; a first display in the first chassis and having a display surface facing a front surface of the first chassis; and a second display in the first chassis and having a display surface facing a rear surface of the first chassis. The first chassis includes: a first glass plate that covers the display surface of the first display, and defines the front surface of the first chassis; a second glass plate that covers the display surface of the second display, and defines the rear surface of the first chassis; and a frame that supports the first glass plate and the second glass plate, and defines lateral surfaces of the first chassis.

An electronic apparatus according to the second aspect of the present invention includes: a chassis; a first display in the chassis and having a display surface facing a front surface of the chassis; and a second display in the chassis and having a display surface facing a rear surface of the chassis. The chassis includes: a first glass plate that covers the display surface of the first display, and defines the front surface of the chassis; a second glass plate that covers the display surface of the second display, and defines the rear surface of the chassis; and a frame that supports the first glass plate and the second glass plate, and defines lateral surfaces of the chassis.

The above-described aspects of the present invention enable an electronic apparatus having thin chassis as well as a plurality of displays.

DETAILED DESCRIPTION

Referring to the drawings, the following describes an electronic apparatus according to the present invention in details by way of one or more embodiments.

Figure 1:
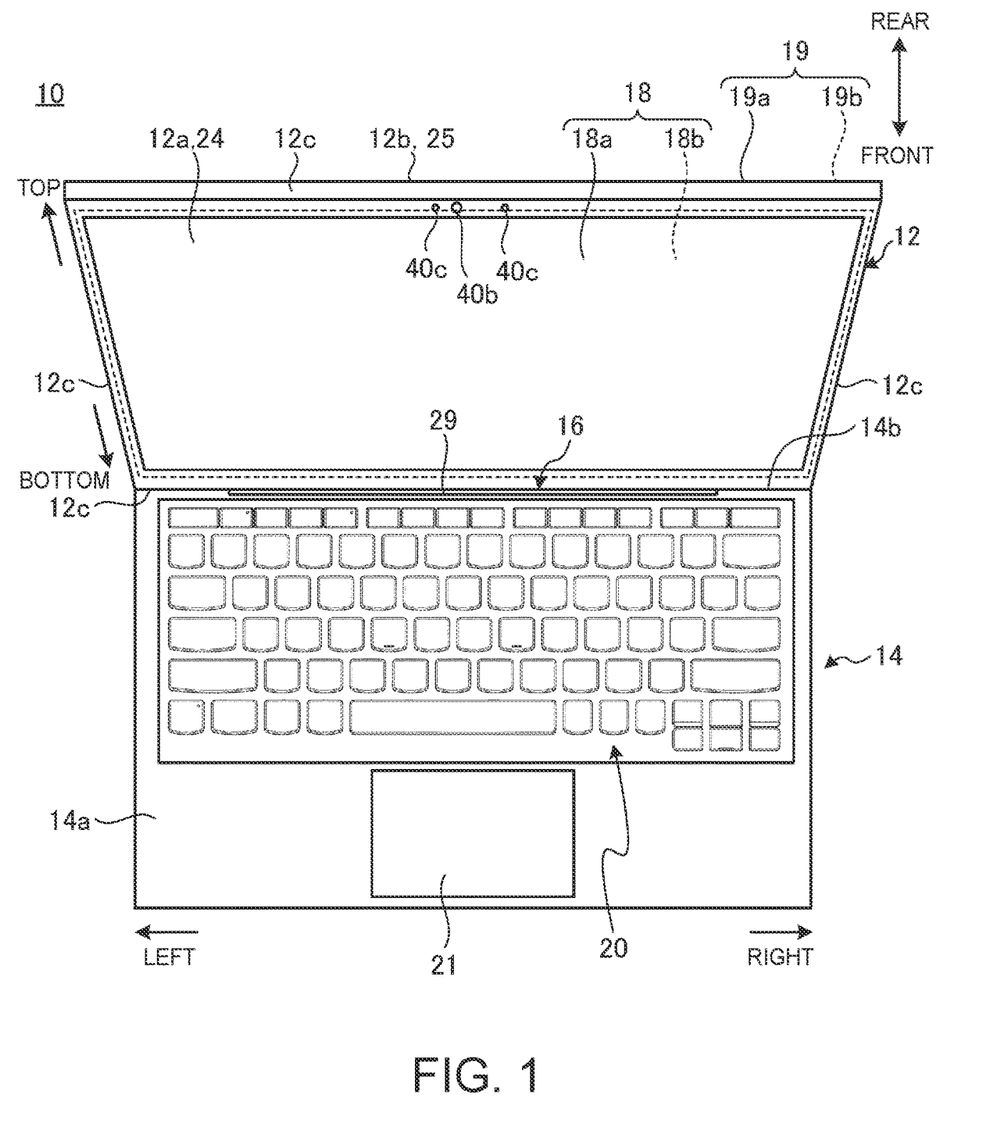
FIG. 1 is a schematic plan view of an electronic apparatus according to one embodiment as viewed from the above.
Figure 2:
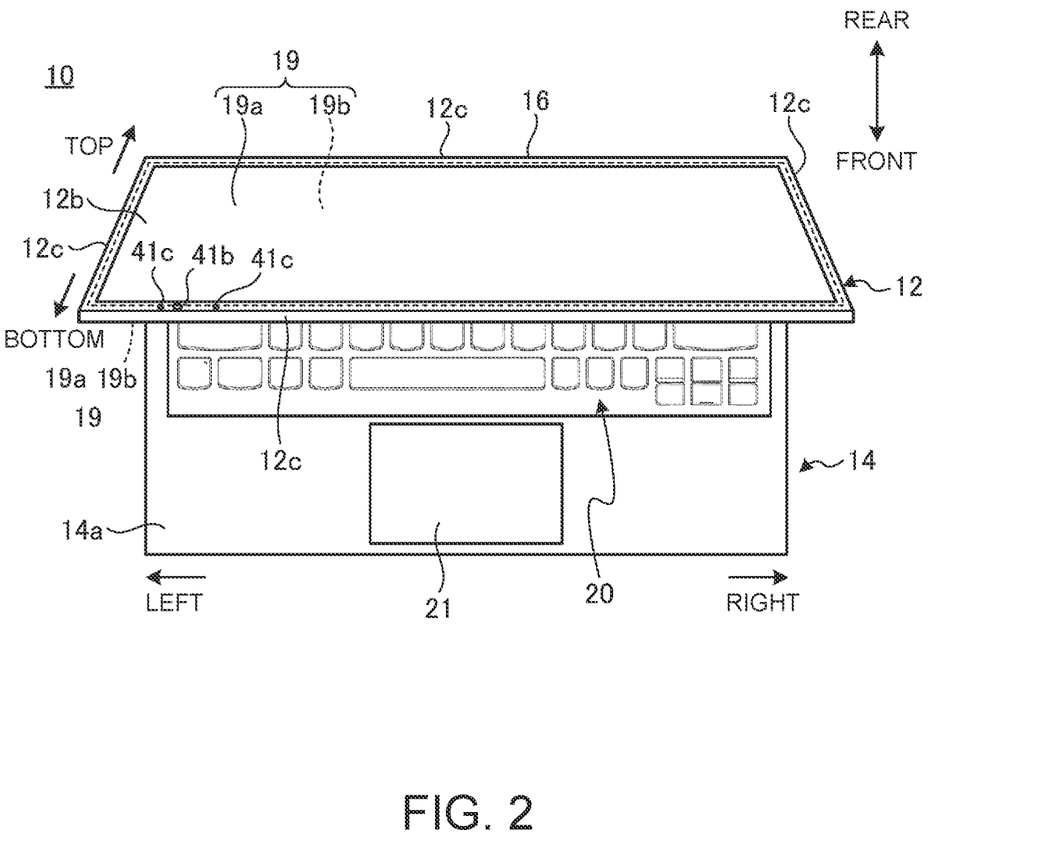
FIG. 2 is a plan view of the electronic apparatus in FIG. 1 having a different angle of the first chassis to illustrate the rear face of the first chassis.

FIG. 1 is a schematic plan view of an electronic apparatus 10 according to one embodiment as viewed from the above. FIG. 2 is a plan view of the electronic apparatus 10 illustrated in FIG. 1 having a different angle of the first chassis 12 to illustrate the rear face 12b of the first chassis. As illustrated in FIGS. 1 and 2, the electronic apparatus 10 is a clamshell-shaped laptop PC including a first chassis 12 and a second chassis 14 that are relatively rotatably connected via a hinge 16. The electronic apparatus 10 has a dual display structure having displays 18 and 19 that are mounted on the front and the rear of the first chassis 12. The electronic apparatus of the present invention may be of various types of electronic apparatuses other than the laptop PC, such a mobile phone, a smartphone, and a portable game machine.

In the following description, with reference to the posture of the electronic apparatus, in which the chassis 12, 14 are set at 90 degrees and a user views the display 18 facing a front surface 12a of the first chassis 12 while manipulating a keyboard 20, a part closer to the user is front, a part away from the user is rear, the width direction is left and right, and the height direction is top and bottom. Note that the 90 degrees is an angle at which the plane directions of the chassis 12 and 14 are orthogonal to each other, and the displays 18 and 19 are placed vertically while placing the second chassis 14 on the desk surface. When the angle is 0 degree, the first chassis 12 is closed on the top surface 14a of the second chassis 14. At this angle, the display 18 is directed downward to be opposed to the keyboard 20, and the display 19 is directed upward.

Figure 3:
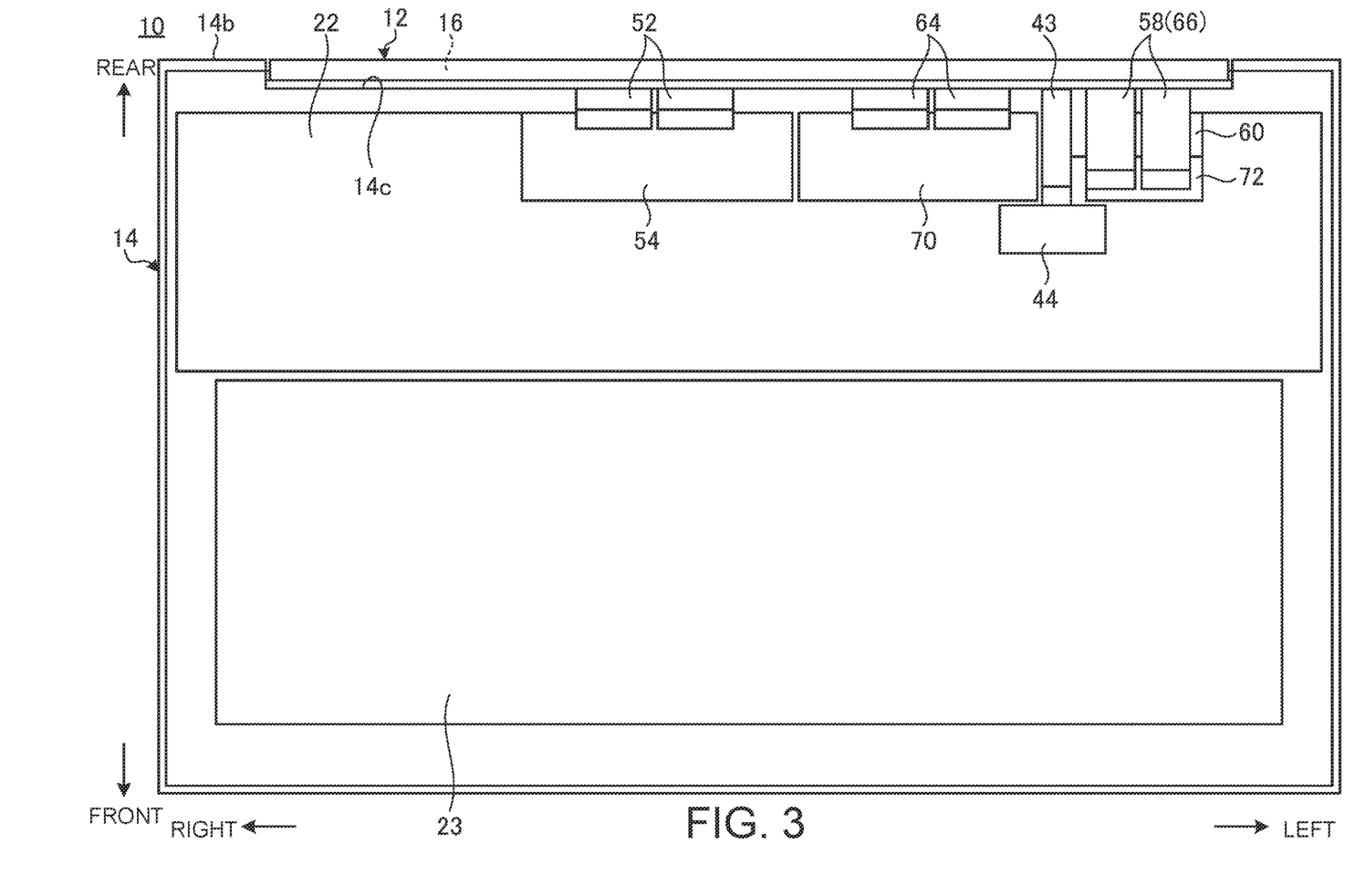
FIG. 3 is a schematic bottom view of the electronic apparatus.

Firstly the configuration of the second chassis 14 is described below. FIG. 3 is a schematic bottom view of the electronic apparatus 10. FIG. 3 is a bottom view of the electronic apparatus 10 (0 degree) when the chassis 12 and 14 are overlapped to hide the display 18. FIG. 3 illustrates the electronic apparatus 10 after a cover defining the bottom surface of the second chassis 14 has been removed.

The second chassis 14 is a flattened box. As illustrated in FIGS. 1 and 2, the second chassis 14 in one example is a box including a cover defining the top surface and the four surrounding lateral surfaces and a cover defining the bottom surface. The top surface 14a of the second chassis 14 comes with a keyboard 20 and a touchpad 21. The second chassis 14 accommodates various types of electronic components such as a motherboard 22 and a battery unit 23 (see FIG. 3) as well as a SSD (Solid State Drive), a memory, and an antenna. The rear lateral surface 14b of the second chassis 14 has a recess 14c like a cutout extending in the left-right direction. In this recess 14c, the hinge 16 is placed. The keyboard 20 may be a mechanical type or a software type keyboard equipped with a touch panel display on the top surface 14a to display an image of the keyboard.

Figure 4:
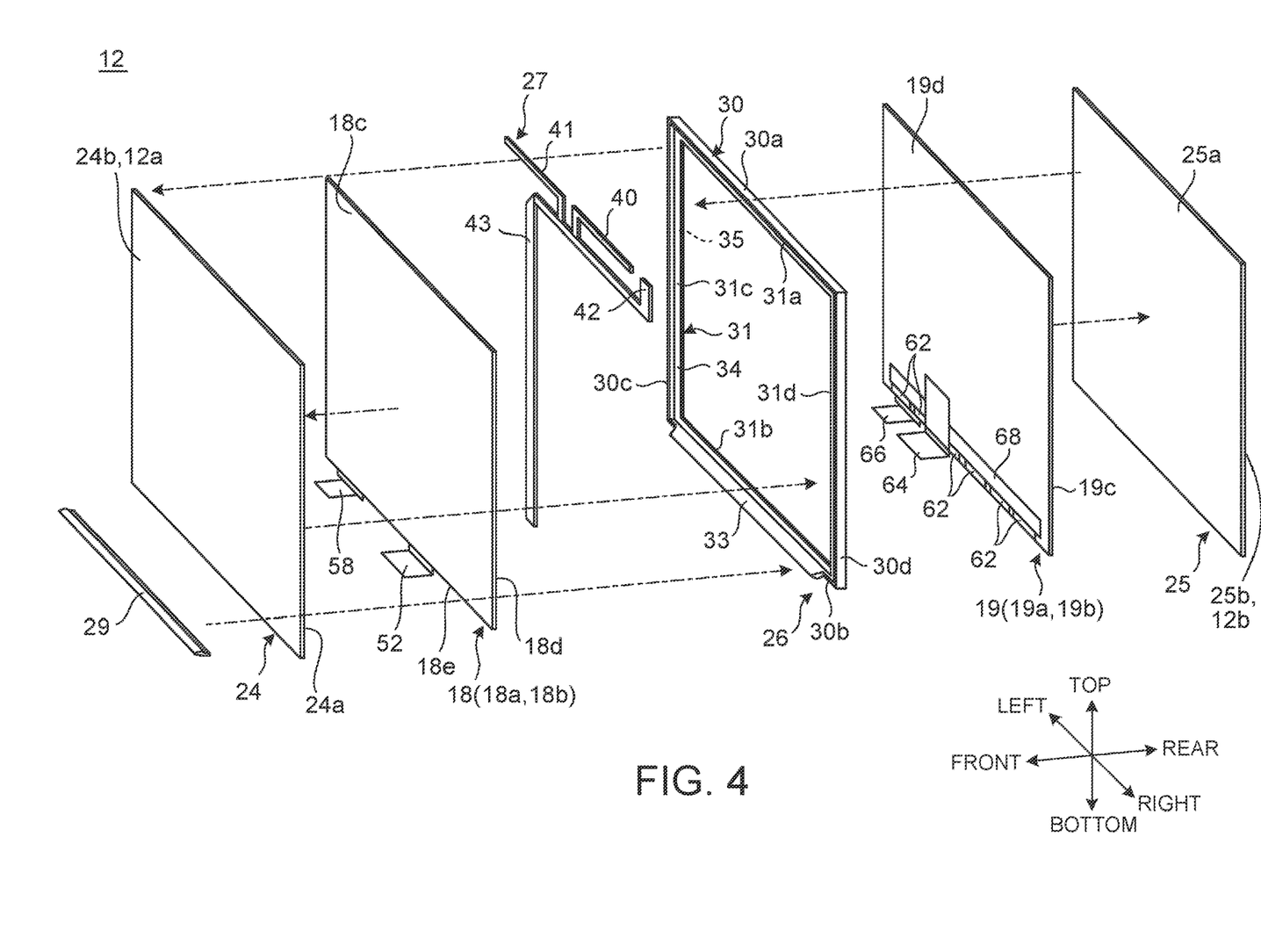
FIG. 4 is a schematic exploded perspective view of a first chassis.
Figure 5:
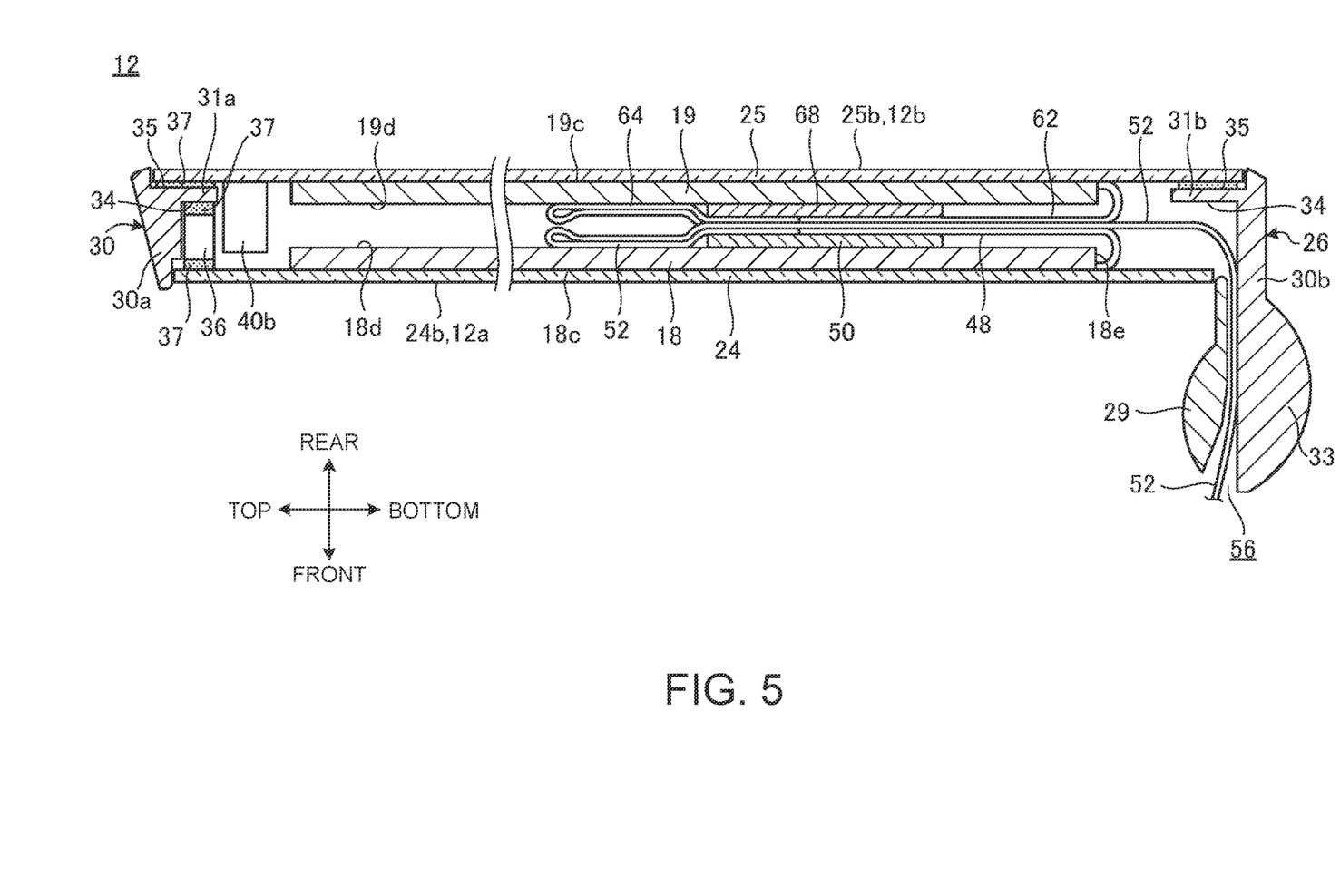
FIG. 5 is a schematic cross-sectional view of the first chassis cut along a plane of the first chassis extending the top-bottom and the front-rear directions.

Next the configuration of the first chassis 12 is described below. FIG. 4 is a schematic exploded perspective view of the first chassis 12. FIG. 5 is a schematic cross-sectional view of the first chassis 12 cut along a plane of the first chassis extending the top-bottom and the front-rear directions.

The first chassis 12 is a flattened box that is thinner than the second chassis 14. As illustrated in FIGS. 1, 2 and 4, the first chassis 12 includes a glass plate 24, a glass plate 25 and a frame 26. The first chassis 12 accommodates the displays 18 and 19 as well as other units including a device unit 27.

As illustrated in FIGS. 4 and 5, the glass plate 24 is a rectangular front glass plate defining the front surface 12a of the first chassis 12. The glass plate 24 is placed to cover a display surface 18c of the display 18. The glass plate 24 has an inner surface 24a facing the inside of the first chassis 12, to which the display 18 is attached. The glass plate 24 has an outer surface 24b facing the outside of the first chassis 12, and the outer surface 24b defines the front surface 12a. The material of the glass plate 24 is not limited, and the glass plate 24 in the present embodiment is made of chemically strengthened glass (called "aluminosilicate glass") containing aluminum oxide and silicon dioxide as main components. The thickness of the glass plate 24 is not limited, and is about 0.5 mm in one example.

As illustrated in FIGS. 4 and 5, the glass plate 25 is a rectangular rear glass plate defining a rear surface 12b of the first chassis 12. The glass plate 25 is placed to cover a display surface 19c of the display 19. The glass plate 25 has an inner surface 25a facing the inside of the first chassis 12, to which the display 19 is attached. The glass plate 25 has an outer surface 25b facing the outside of the first chassis 12, and the outer surface 25b defines the rear surface 12b. The glass plate 25 may be made of the same material (aluminosilicate glass) as that of the glass plate 24 and have the same thickness (0.5 mm) as the glass plate 24, or may be made of a different material or have a different thickness. When the angle between the chassis 12 and 14 is 0 degree, the glass plate 25 defines the outer surface of the electronic apparatus 10. To this end, the glass plate 25 may be thicker and stronger than the glass plate 24.

As illustrated in FIGS. 4 and 5, the frame 26 is a rectangular frame. The frame 26 defines the four surrounding lateral surfaces 12c of the first chassis 12. The frame 26 is a support frame for the glass plates 24 and 25.

In one example, the frame 26 is prepared by shaping a metal material, such as amorphous metal, aluminum, or magnesium into a frame form by injection molding, die casting, or the like, and then performing machining, such as cutting. Amorphous metal is also called metallic glass, and is a non-crystalline metal whose main component is a metal element. Amorphous metals include Zr-based and Ti-based amorphous metals. The frame 26 of the present embodiment may be made of Ti-based amorphous metal for structural reasons of integrating the hinge 16 with the first chassis 12. Amorphous metals have properties that are less likely to be plastically deformed than typical metal materials used for chassis of electronic apparatuses, such as aluminum and magnesium, and have higher rigidity than resins and carbon-based materials (carbon fiber reinforced resin). The frame 26 may be made of a resin or a carbon-based material depending on the specifications and configuration of the electronic apparatus 10.

The frame 26 has an outer wall 30 and a glass support 31.

The outer wall 30 is a narrow frame defining the four surrounding lateral surfaces 12c of the first chassis 12. The outer wall 30 has a top wall 30a, a bottom wall 30b, a left wall 30c, and a right wall 30d. The walls 30a and 30b are vertical walls that extend in the left-right direction and are narrow in the top-bottom direction and wide in the front-rear direction. The walls 30c and 30d are vertical walls that extend in the top-bottom direction and are narrow in the left-right direction and wide in the front-rear direction. A decorative plate may be further placed on the outer surface of the outer wall 30 to enhance the design of the lateral surface 12c with this decorative plate.

The bottom wall 30b has a protrusion 33 at most of the width except for the left and right ends. The protrusion 33 protrudes forward like a jaw from the front surface 12a of the first chassis 12. The protrusion 33 is wider in the front-rear direction than the other portions of the outer wall 30, and has a curved outer surface. The protrusion 33 has an inner surface (upper surface) covered by a bezel 29. The bezel 29 is a strip-shaped plate having a curved outer surface (upper surface).

The protrusion 33 and the bezel 29 make up a hinge block to hide the elements of the hinge 16. The protrusion 33 has shaft holes at left and right ends, into which the hinge shaft of the hinge 16 is non-rotatably fitted. This connects the hinge 16 to the first chassis 12. A mounting plate is connected to the hinge shaft to be rotatable with a predetermined rotational torque, and the mounting plate is fixed to the second chassis 14. With this configuration, the hinge 16 connects the chassis 12 and 14 so as to be relatively rotatable with a predetermined rotational torque. The configuration of the hinge 16 and the attachment structure for the chassis 12 and 14 can be changed as appropriate.

As illustrated in FIGS. 4 and 5, the glass support 31 extends along the peripheral edge of the glass plates 24 and 25 to support the glass plates 24 and 25. The glass support 31 includes a protruding piece that protrudes from the inner periphery of the outer wall 30 to the inside of the frame 26. The glass support 31 has a top support 31a, a bottom support 31b, a left support 31c, and a right support 31d. The supports 31a to 31d extend along the longitudinal directions of the walls 30a to 30d, respectively. The glass support 31 has a front support surface 34 of the supports 31a to 31d facing the front surface 12a, and the front support surface 34 serves as a surface to which the glass plate 24 is fixed. The glass support 31 has a rear support surface 35 of the supports 31a to 31d facing the rear surface 12b, and the rear support surface 35 serves as a surface to which the glass plate 25 is fixed.

As illustrated in FIG. 5, the periphery of the inner surface 24a of the glass plate 24 is fixed to the front support surface 34 of the supports 31a to 31d via a spacer 36. The periphery of the inner surface 25a of the glass plate 25 is fixed to the rear support surface 35 of the supports 31a to 31d with adhesive 37. Examples of the adhesive 37 include a double-sided tape and a bond.

Although FIG. 5 does not illustrate the support structure of the glass plates 24 and 25 by the left and right supports 31c and 31d, this may be the same as or similar to the support structure by the top support 31a. As illustrated in FIG. 5, the bottom support 31b does not support the glass plate 24 at a part of the position where the bottom support 31b overlaps with the flexible board 52 and the like, which will be described later. The spacer 36 is fixed to the front support surface 34 and to the glass plate 24 with the adhesive 37. The glass plate 24 may be directly fixed to the front support surface 34 without the spacer 36. The glass plate 25 may be fixed to the rear support surface 35 via a spacer 36.

Figure 6:
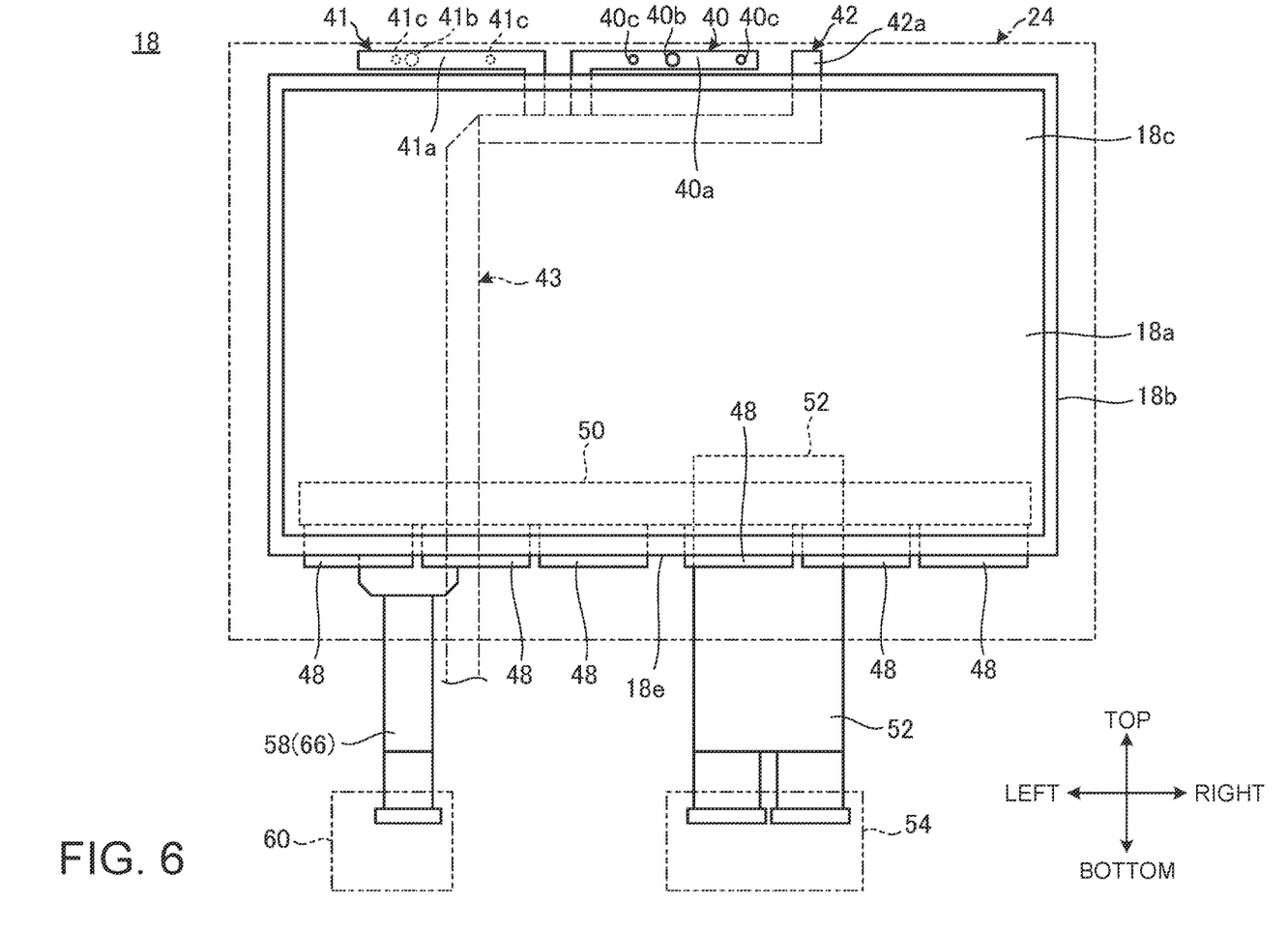
FIG. 6 is a schematic front view of a display viewed from the front surface.
Figure 7:
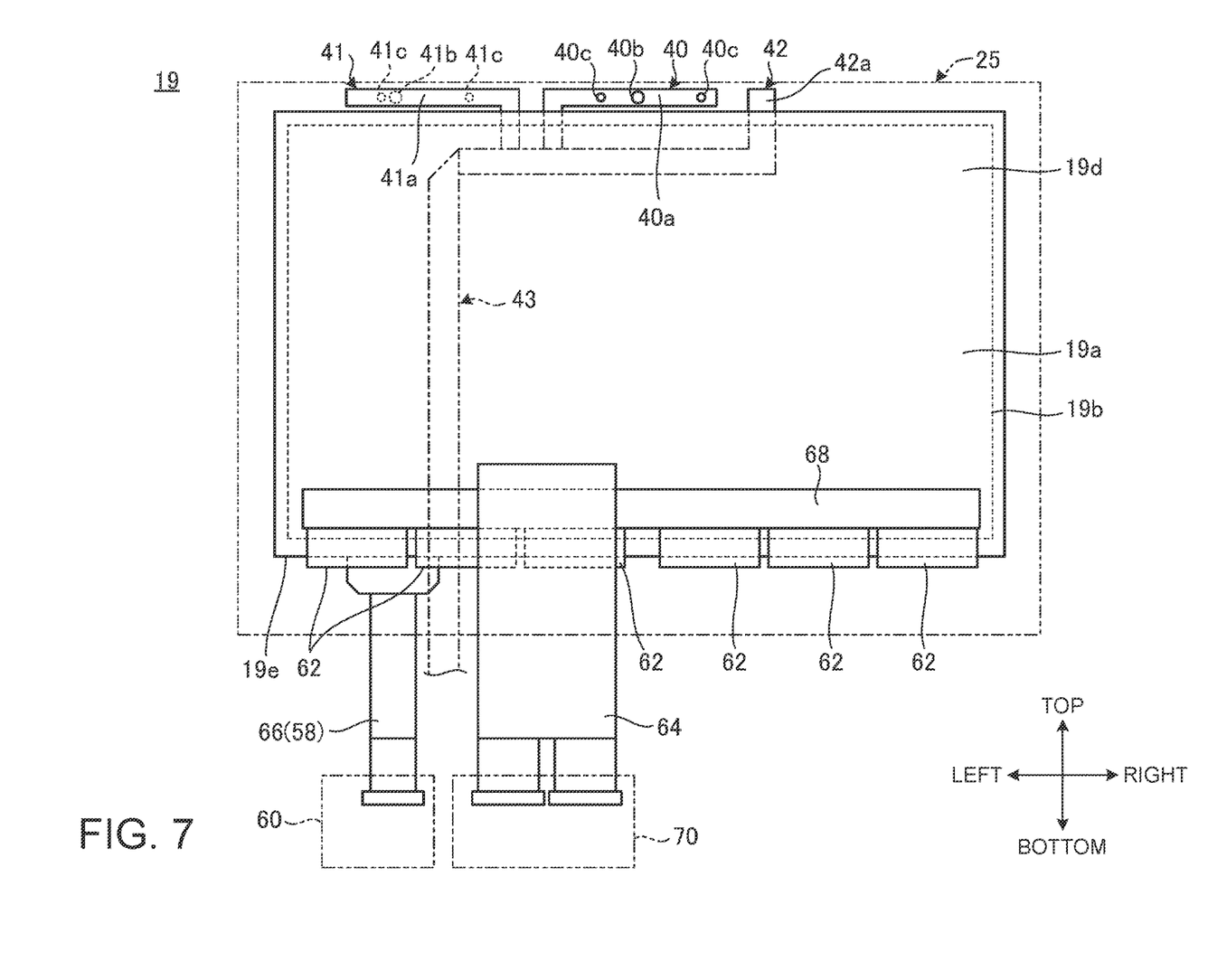
FIG. 7 is a schematic front view of a display viewed from the front surface.

Next the configuration of the device unit 27 is described below. FIG. 6 is a schematic front view of the display 18 viewed from the front surface 12a. FIG. 7 is a schematic front view of the display 19 viewed from the front surface 12a. FIG. 6 is a view of the display 18 viewed from the display surface 18c. FIG. 7 is a view of the display 19 viewed from the rear surface 19d of the display surface 19c.

As illustrated in FIGS. 4, 6 and 7, the device unit 27 has a front camera unit 40, a rear camera unit 41, a light unit 42, and a flexible board 43.

The front camera unit 40 is a device that captures images and collects sound in front of the front surface 12a of the first chassis 12. The front camera unit 40 is configured so that a camera 40b and a pair of microphones 40c and 40c are mounted on a substrate 40a. The substrate 40a has a rod shape that is narrow in the top-bottom direction and long in the left-right direction. The camera 40b and the microphones 40c are mounted on the surface of the substrate 40a facing the front surface 12a. The front camera unit 40 is configured so that the substrate 40a extending in the left-right direction is placed above the upper edge of the display 18, and the camera 40b and the microphones 40c face the front surface 12a through holes formed in the glass plate 24. The camera 40b is placed substantially at the center in the left-right direction of the first chassis 12.

The rear camera unit 41 is a device that captures images and collects sound behind the rear surface 12b of the first chassis 12. The rear camera unit 41 is configured so that a camera 41b and a pair of microphones 41c and 41c are mounted on a substrate 41a. The substrate 41a has a rod shape that is narrow in the top-bottom direction and long in the left-right direction. The camera 41b and the microphones 41c are mounted on the surface of the substrate 41a facing the rear surface 12b. The rear camera unit 41 is configured so that the substrate 41a extending in the left-right direction is placed above the upper edge of the display 19, and the camera 41b and the microphones 41c face the rear surface 12b through holes formed in the glass plate 25. The camera 41b is placed at a position closer to the left end of the first chassis 12 in the left-right direction.

The light unit 42 has a light emitting unit 42a. In one example, the light emitting unit 42a is a substrate on which one or a plurality of LEDs (light emitting diodes) is mounted. The light emitting unit 42a may have a configuration of the LED(s) mounted on both the front surface 12a and the rear surface 12b of the substrate, or a configuration of the LED(s) mounted on only one surface between the front surface 12a and the rear surface 12b. In one example, the LED(s) of the light emitting unit 42a notifies the operating state of the electronic apparatus 10 or an answer in response to a user's call.

The flexible board 43 has an upper first end that branches off into three parts connected to the front camera unit 40, the rear camera unit 41 and the light unit 42, and a lower second end connected to a control board 44 (see FIG. 3) in the second chassis 14. The flexible board 43 extends from the top to the bottom between the displays 18 and 19 in the first chassis 12, passes over the inner surface of the protrusion 33, and enters the second chassis 14. The control board 44 controls the cameras 40b, 41b, the microphones 40c, 41c, and the light emitting unit 42a.

In one example, the flexible board 43 is a flexible printed circuit board (FPC) formed from a flexible insulating film to be thin and soft. The other flexible boards 48, 52, 58, 62, 64, and 66 described later also have the same structure as the flexible board 43.

Next the configuration of the displays 18 and 19 is described below.

As described above, the electronic apparatus 10 includes the display 18 at the front surface 12a of the first chassis 12 as well as the display 19 at the rear surface 12b (see FIGS. 1 and 2). The display 18 at the front surface 12a can be used together with the keyboard 20, for example, when the electronic apparatus 10 is used as a laptop PC. The display 19 at the rear surface 12b is visible from the rear in the state of FIG. 2, for example. Therefore, the display 19 allows a user to use the electronic apparatus 10 as a display device to view a movie or the like, or to use the electronic apparatus 10 as a display device when the user gives a presentation to a person sitting face-to-face.

As illustrated in FIG. 6, the display 18 has a display portion 18a that faces the front surface 12a and displays an image, and a touch panel portion 18b for touch operation from the front surface 12a. As illustrated in FIG. 7, the display 19 has a display portion 19a that faces the rear surface 12b and displays an image, and a touch panel portion 19b for touch operation from the rear surface 12b.

The display portion 18a, 19a of the present embodiment includes an organic EL (pOLED: plastic Organic Light Emitting Diode) formed with a plastic plate as a substrate. The display portion 18a, 19a may include an organic EL or a liquid crystal formed with a glass plate as a substrate. One of or both the touch panel portions 18b and 19b may be omitted.

Firstly the configuration of the display 18 is described below. As illustrated in FIGS. 4 to 6, a plurality of flexible boards 48 arranged along the longitudinal direction of the display 18 connects to the lower edge 18e of the display 18. In the present embodiment, six flexible boards 48 are connected side by side to the lower edge 18e, for example. Each flexible board 48 is connected to a corresponding one of the six IC chips that control the resolution of the display portion 18a.

On a lower part of the rear surface 18d of the display 18, a strip-shaped relay board 50 extending in the left-right direction and the flexible board 52 connected to the relay board 50 are placed. Each flexible board 48 protrudes downward from the lower edge 18e, is folded upward along the rear surface to extend upward, and is connected to the relay board 50 from the below. The flexible board 52 is connected to the relay board 50 from the above. The flexible board 52 connects the display 18 and the display board 54 (see FIG. 3) mounted in the second chassis 14. The display board 54 is a printed circuit board (PCB) for controlling the display portion 18a. The display board 54 is a sub-board for controlling the image display on the display portion 18a, and connects to the motherboard 22.

The flexible board 52 extends upward from the relay board 50 along the rear surface 18d of the display 18, and then is folded downward to extend on the rear side. After this folding, the flexible board 52 passes over the rear surface of the relay board 50 and of the flexible board 48 while extending downward along the rear surface 18d of the display 18. In the front view of the first chassis 12, the flexible board 52 is offset slightly to the left from the center in the left-right direction. The protrusion 33 and the bezel 29 define a slit-like opening groove 56 therebetween that penetrates through the inside and outside of the first chassis 12. The flexible board 52 passes through this opening groove 56 to leave the first chassis 12, and then enters the second chassis 14 (see FIG. 5). The configuration example illustrated in FIGS. 3 and 6 includes two of the left and right flexible boards 52 as a pair placed side by side, and they are connected to the display board 54.

The relay board 50 is fixed to the rear surface 18d of the display 18. The relay board 50 distributes the single flexible board 52 connected to the display board 54 over the six flexible boards 48. The six flexible boards 48 are connected to the display 18, and it is difficult to introduce these six flexible boards 48 as they are to the second chassis 14. Then, the present embodiment is configured so that signals from the six flexible boards 48 are collected to the single flexible board 52 via the relay board 50 and then the single flexible board 52 is connected to the display board 54 in the second chassis 14. This suppresses an increase in the left and right width of the protrusion 33 and the bezel 29 as a hinge block or avoids a complicated configuration there. For a thinner first chassis 12, the relay board 50 may be placed below the lower edge 18e of the display 18. Note that, when the relay board 50 is placed at this position, a wide bezel will be formed below the display 18 and the appearance quality deteriorates. The present embodiment therefore places the relay board 50 behind the display 18. The same goes for a relay board 68 described later.

As illustrated in FIGS. 4 and 6, a flexible board 58 is connected to the left end of the lower edge 18e of the display 18. This flexible board 58 connects the touch panel portion 18b and a touch panel board 60 (see FIG. 3) mounted in the second chassis 14. The touch panel board 60 is a printed circuit board for controlling the touch panel portion 18b. The touch panel board 60 converts an analog signal based on a touch operation detected by the touch panel portion 18b into a predetermined digital signal and transmits the digital signal to the motherboard 22. The configuration example illustrated in FIG. 3 includes two of the left and right flexible boards 58 as a pair placed side by side, and they are connected to the touch panel board 60.

Similarly to the flexible board 52, the flexible board 58 passes through the opening groove 56 to leave the first chassis 12, and then enters the second chassis 14. As illustrated in FIG. 6, the flexible board 43 of the device unit 27 is located on the right of the flexible board 58, and extends from the first chassis 12 to the second chassis 14.

Next the configuration of the display 19 is described below. As illustrated in FIGS. 4 to 7, the display 19 has the same configuration as the display 18 and is placed to face the rear surface 12b. That is, the display 19 includes flexible boards 62, 64, 66 and a relay board 68 having the same configuration as or a similar configuration to the flexible boards 48, 52, and 58 and the relay substrate 50 of the display 18.

Six flexible boards 62 arranged along the longitudinal direction of the display 19 connect to the lower edge 19e of the display 19. Each flexible board 62 is connected to a corresponding one of the six IC chips that control the resolution of the display portion 19a.

The relay board 68 extends in the left-right direction at the lower part of the rear surface 19d of the display 19. In this embodiment, the relay board 68 is placed behind the relay board 50. Each flexible board 62 protrudes downward from the lower edge 18e, is folded upward along the rear surface to extend upward, and is connected to the relay board 68 from the below. The flexible board 64 is connected to the relay board 68 from the above. The flexible board 64 connects the display 19 and a display board 70 (see FIG. 3) mounted in the second chassis 14. The display board 70 is a printed circuit board for controlling the display portion 19a, and connects to the motherboard 22.

The flexible board 64 extends upward from the relay board 68 along the rear surface 19d of the display 19, and then is folded downward to extend on the rear side. After this folding, the flexible board 64 passes over the front surface of the relay board 68 and of the flexible board 62 while extending downward along the rear surface 19d of the display 19. Viewing the first chassis 12 from the front surface 12a, the flexible board 64 is offset slightly to the right from the center in the left-right direction. This makes the flexible board 64 not overlap with the flexible board 52 in the left-right direction, and they are displaced (see also FIG. 5). The flexible board 64 passes through the opening groove 56 next to the flexible board 52 to leave the first chassis 12, and then enters the second chassis 14. The configuration example illustrated in FIGS. 3 and 7 includes two of the left and right flexible boards 64 as a pair placed side by side, and they are connected to the display board 70.

The relay board 68 is fixed to the rear surface 19d of the display 19, and distributes the single flexible board 64 connected to the display board 70 over the six flexible boards 62.

As illustrated in FIGS. 4 and 7, a flexible board 66 is connected to the left end of the lower edge 19e of the display 19. This flexible board 66 connects the touch panel portion 19b and a touch panel board 72 (see FIG. 3) mounted in the second chassis 14. The touch panel board 72 is a printed circuit board for controlling the touch panel portion 19b, and has the same function as that of the touch panel board 60. The configuration example illustrated in FIG. 3 includes two of the left and right flexible boards 66 as a pair placed side by side, and they are connected to the touch panel board 72.

The flexible board 66 is overlapped with the flexible board 58 on the display 18, and these overlapped flexible boards extend from the first chassis 12 to the second chassis 14. This is because there is a limit in the space in the left-right direction of the chassis 12 and 14, and so it is difficult for the present embodiment to displace the flexible boards 58 and 66 for the touch panel portions 18b and 19b to the left and right. Instead, the tips of the flexible boards 58 and 66 are displaced to the front and rear in the second chassis 14, so that the flexible board 58 connects to the touch panel board 60 on the rear and the flexible board 66 connects to the touch panel board 72 on the front.

As described above, the electronic apparatus 10 according to the present embodiment includes the first chassis 12 accommodating the display 18 facing the front surface 12a and the display 19 facing the rear surface 12b. The first chassis 12 accommodates the glass plate 24 placed to cover the display surface 18c of the display 18 and defining the front surface 12a, the glass plate 25 placed to cover the display surface 19c of the display 19 and defining the rear surface 12b, and the frame 26 that supports the glass plates 24 and 25 and defines the lateral surfaces 12c of the first chassis 12.

In this way, the electronic apparatus 10 includes the displays 18 and 19 at the front surface 12a and the rear surface 12b of the first chassis 12, and so has improved convenience and is applicable to various usage patterns. The glass plate 24 that protects the display 18 and the glass plate 25 that protects the display 19 double as the chassis members of the first chassis 12, and these glass plates are supported by the frame 26. With this configuration, the first chassis 12 is sufficiently thin while accommodating the two displays 18 and 19 and their accessary components, such as the relay board 50. As a result, the first chassis 12 of the present embodiment has a thickness reduce to about 3.5 mm, for example.

In the electronic apparatus 10, the flexible board 52 that connects the display 18 and the display board 54 and the flexible board 64 that connects the display 19 and the display board 70 are mutually displaced in the plane direction (left-right direction) of the first chassis 12. With this configuration, the flexible boards 52 and 64 connecting to the displays 18 and 19 do not overlap in the thickness direction of the first chassis 12, and do not hinder thinning of the first chassis 12.

Each of the displays 18 and 19 of the electronic apparatus 10 is an organic EL display including a plastic plate as a substrate. The displays 18 and 19 therefore can be made thinner than an organic EL display or a liquid crystal display including a glass plate as the substrate, so that the first chassis 12 can be further made thinner. At least one of the displays 18 and 19 may be an organic EL display including a plastic plate as a substrate. When the first chassis 12 becomes thin in this way, there is a concern that the first chassis 12 itself and the displays 18 and 19 may be easily damaged due to a dropping impact, for example. In this respect, the electronic apparatus 10 is not easily damaged because the displays 18 and 19 are organic EL displays including a plastic plate as a substrate. Also the first chassis 12 has the surrounding lateral surfaces 12c formed with the frame 26, and this suppresses a damage of the chassis.

In particular, the frame 26 of this embodiment is made of amorphous metal. Amorphous metals have properties that are less likely to be plastically deformed than typical frame materials for electronic apparatuses, such as aluminum and magnesium. Therefore, although the frame 26 of the first chassis 12 is thin, plastic deformation of the frame 26 due to an impact can be suppressed. Since the frame 26 is not easily plastically deformed, damage to the glass plates 24 and 25 and the displays 18 and 19 supported by the frame 26 also can be suppressed.

In the electronic apparatus 10, the flexible board 58 that connects the touch panel portion 18b of the display 18 and the touch panel board 60 and the flexible board 66 that connects the touch panel portion 19b of the display 19 and the touch panel board 72 are mutually overlapped. This is because, as described above, it is difficult to displace the flexible boards 58 and 66 to the left and right because of a space limitation of the chassis 12 and 14 in the left-right direction.

Unlike the display portions 18a and 19a having the plurality of flexible boards 48 and 62 arranged side by side, the touch panel portions 18b and 19b do not require a plurality of flexible boards arranged side by side for connection, and instead, the flexible boards 58 and 66 directly connect to the lower edges 18e and 19e. That is, the flexible boards 52 and 64 for the display units 18a and 19a do not operate alone, and operate in combination with the flexible boards 48 and 62 for relay and the relay boards 50 and 68, so that the thickness of these boards in the first chassis 12 is large as a whole, including the folding at some portions. On the contrary, the flexible boards 58 and 66 for the touch panel portions 18b and 19b do not require a flexible board for relay and a relay board, and are not folded. For this reason, although the flexible boards 58 and 66 are overlapped in the chassis, the overall thickness is smaller than the boards in the display portions 18a and 19a, and the overlapping of these boards does not hinder thinning of the first chassis 12.

In the electronic apparatus 10, the camera 40b facing the front surface 12a and the camera 41b facing the rear surface 12b are placed side by side along the upper edge of the first chassis 12. As illustrated in FIG. 5, it is difficult to reduce the dimensions of the cameras 40b and 41b in the thickness direction of the first chassis 12 (shooting direction) due to their structure. The present embodiment therefore is configured to displace the left-right positions of the cameras 40b and 41b to avoid the overlapping of the cameras 40b and 41b in the thickness direction of the first chassis 12 and not to hinder the thinning of the chassis.

In the electronic apparatus 10, the camera 40b facing the front surface 12a is placed at a position closer to the center than the camera 41b facing the rear surface 12b in the longitudinal direction of the upper edge (left-right direction) of the first chassis 12 (see FIGS. 1, 2 and 7). That is, this configuration assumes that the camera 40b is used together with the keyboard 20 when the user uses the electronic apparatus 10 during a Web conference a videophone call. This usage assumes that the user will be seated directly in front of the electronic apparatus 10 (keyboard 20). To this end, the electronic apparatus 10 has the camera 40b used for this purpose placed at a position close to the center in the left-right direction of the first chassis 12, so that the user can be captured at the center of the camera 40b. Unlike the camera 40b, the camera 41b on the rear surface 12b is assumed to be used as a substitute for a digital camera. The camera 41b therefore may be slightly offset from the center in the left-right direction of the first chassis 12, and there is no great disadvantage in use.

The present invention is not limited to the above-described embodiments and can be modified freely without deviating from the scope of the present invention.

The above describes a clam-shell shaped electronic apparatus in which two chassis 12 and 14 are rotatably connected. In another example, the electronic apparatus may be a single plate-shaped tablet PC, a smartphone, or the like in which a chassis equipped with the displays 18 and 19 stores components such as the motherboard 22 and the battery device 23 like the first chassis 12.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

10 Electronic apparatus
12 First chassis
14 Second chassis
16 Hinge
18, 19 Display
20 Keyboard
24, 25 Glass plate
26 Frame
40b, 41b Camera
43, 48, 52, 58, 62, 64, 66 Flexible board
50, 68 Relay board
54, 70 Display board
60, 72 Touch panel board

What is claimed is:
1. An electronic apparatus comprising:
a first chassis;

a second chassis connected to the first chassis via a hinge and that rotates on the hinge;
a first display in the first chassis with a first display surface facing a front surface of the first chassis;
a second display in the first chassis with a second display surface facing a rear surface of the first chassis;
a first display board, in the second chassis, that controls the first display;
a second display board, in the second chassis, that controls the second display;
a first flexible board that extends from the first chassis to the second chassis and connects the first display and the first display board; and
a second flexible board that extends from the first chassis to the second chassis and connects the second display and the second display board, wherein
the first chassis comprises:
   a first glass plate that covers the first display surface and constitutes the front surface of the first chassis;
   a second glass plate that covers the second display surface and constitutes the rear surface of the first chassis; and
   a frame that supports the first glass plate and the second glass plate and constitutes lateral surfaces of the first chassis, and
in the first chassis, the first flexible board and the second flexible board are displaced in a plane direction of the first chassis.

2. The electronic apparatus according to claim 1, further comprising:
third flexible boards connected to one edge of the first display;
a first relay board disposed between the first display and the second display and that connects to the first flexible board and the third flexible boards;
fourth flexible boards connected to one edge of the second display; and
a second relay board disposed between the first display and the second display and that connects to the second flexible board and the fourth flexible boards, wherein
the first flexible board connects to the first display via the first relay board and the third flexible boards, and
the second flexible board connects to the second display via the second relay board and the fourth flexible boards.

3. The electronic apparatus according to claim 2, wherein
the first display includes a first touch panel,
the second display includes a second touch panel, and
the electronic apparatus further comprises:
   in the second chassis:
      a first touch panel board that controls the first touch panel;
      a second touch panel board that controls the second touch panel;
   a fifth flexible board that extends from the first chassis to the second chassis and connects the first touch panel and the first touch panel board; and
   a sixth flexible board that extends from the first chassis to the second chassis and connects the second touch panel and the second touch panel board, wherein
the fifth flexible board overlaps the sixth flexible board.

4. The electronic apparatus according to claim 1, further comprising:
a first camera in the first chassis and that faces the front surface of the first chassis;
a second camera in the first chassis and that faces the rear surface of the first chassis; and
a keyboard on a top face of the second chassis, wherein
the keyboard faces the first display when the first chassis is rotated to overlap with the top face of the second chassis,
the first camera and the second camera are disposed along one edge of the first chassis, and
in a longitudinal direction of the first chassis, the first camera is closer to a center of the one edge than the second camera.

5. The electronic apparatus according to claim 1, wherein at least one of the first display and the second display includes an organic EL display including a plastic plate as a substrate.

* * * * *